Dec. 27, 1960　　　　E. A. ADAMS　　　　2,966,126
DOUGHNUT MAKING MACHINE
Filed Jan. 23, 1959　　　　　　　　　　　3 Sheets-Sheet 1
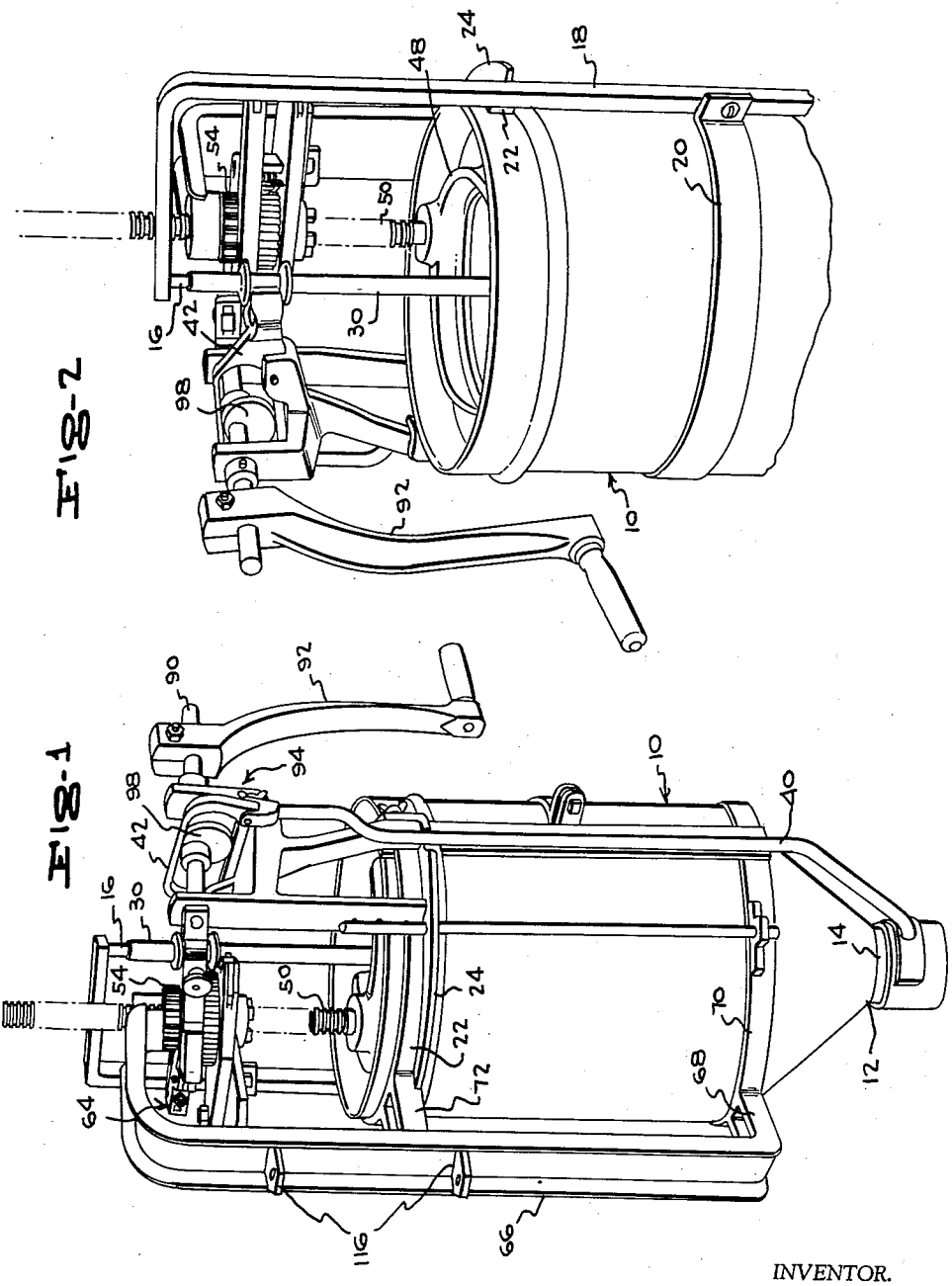
INVENTOR.
ERNEST A. ADAMS
BY
McMorrow, Berman + Davidson
ATTORNEYS

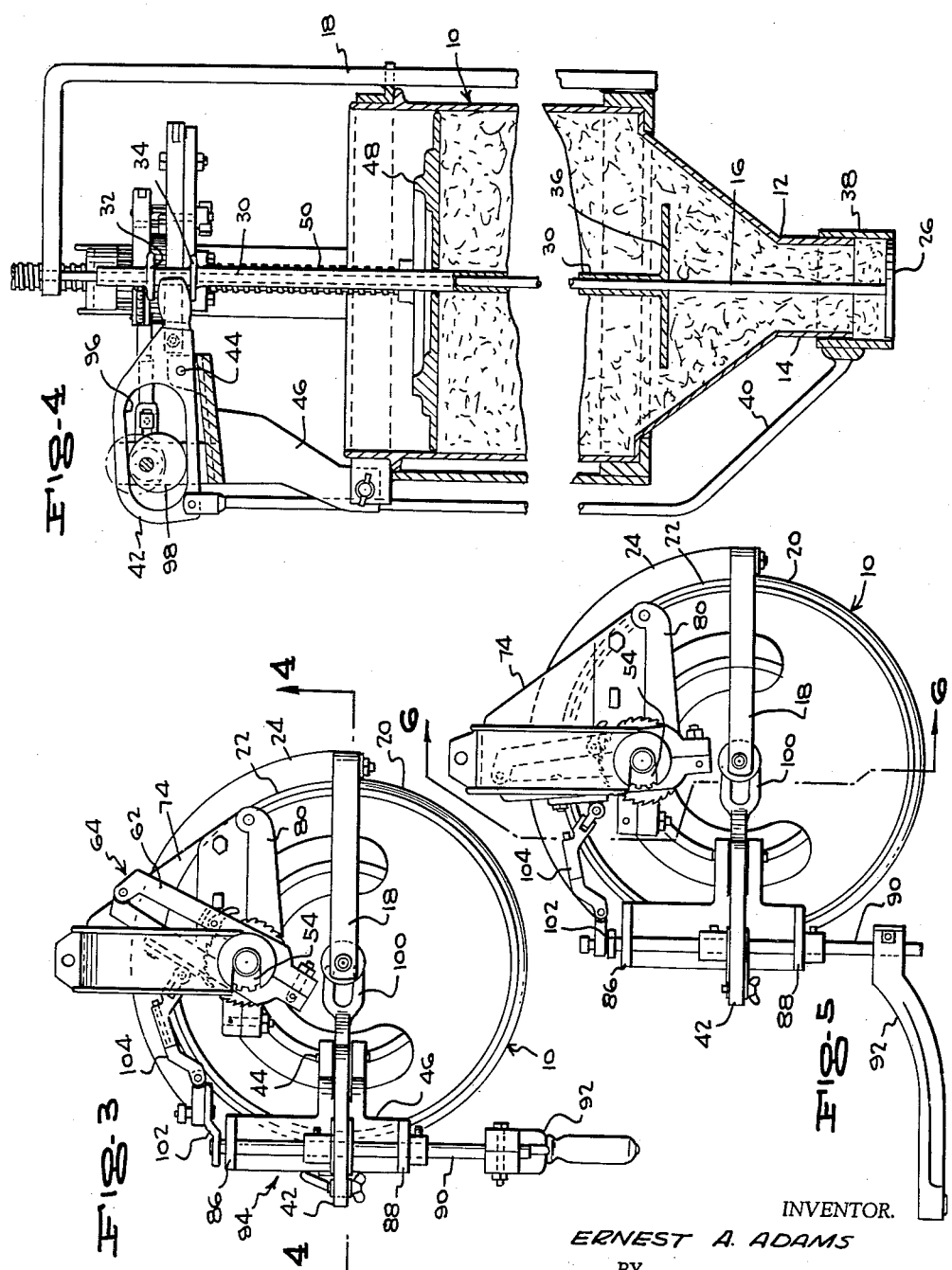

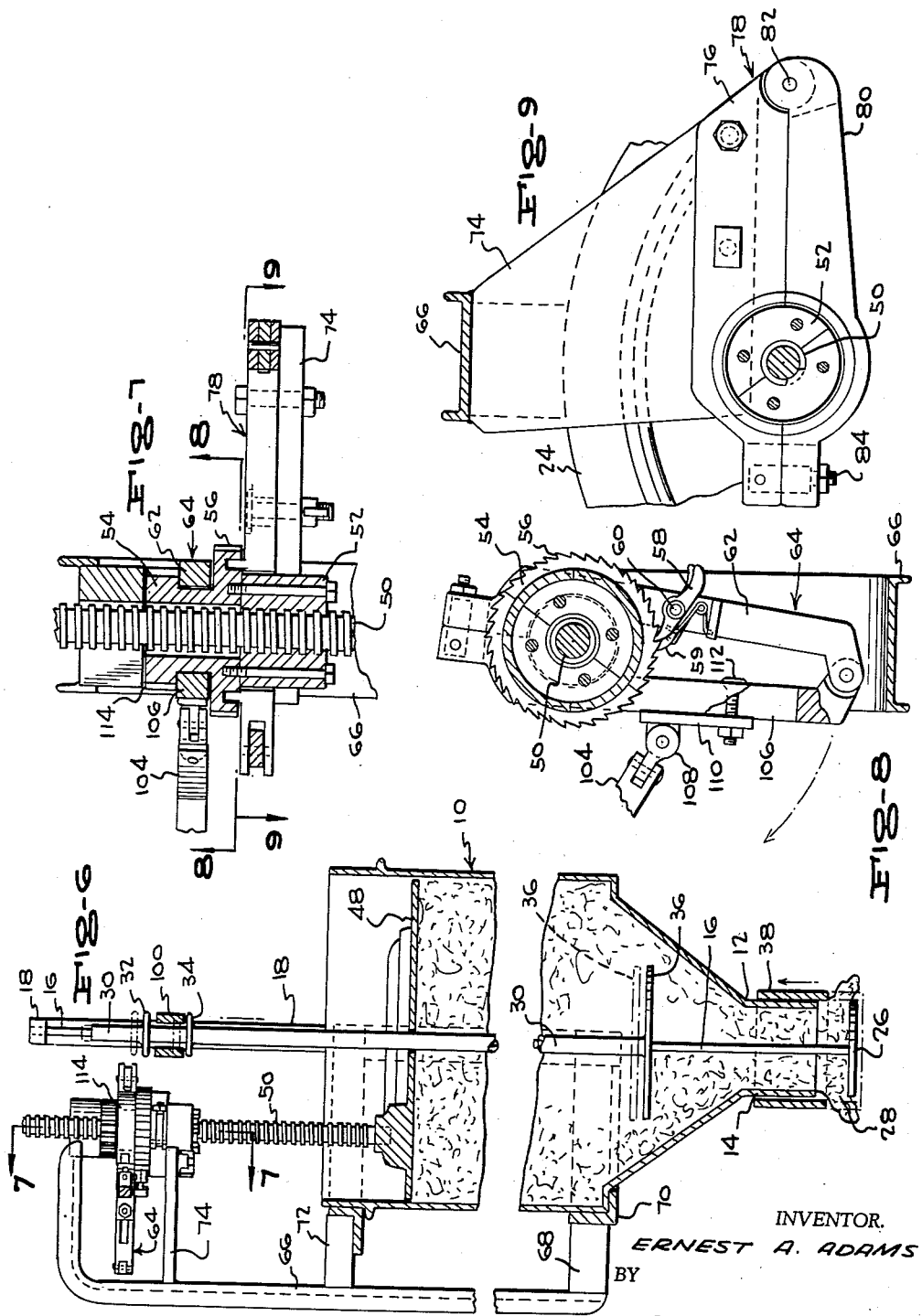

`2,966,126`

DOUGHNUT MAKING MACHINE

Ernest A. Adams, 5425 S. State St., Tacoma 9, Wash., assignor of one-half to Rose Adams, Tacoma, Wash.

Filed Jan. 23, 1959, Ser. No. 788,586

3 Claims. (Cl. 107—14)

The present invention relates to a doughnut making machine.

Presently in use are doughnut making machines employing a hopper for holding a mass of dough to be formed into doughnuts, a piston mechanism for ejecting a quantity of dough, and a forming device for shaping the ejected dough to ring shape prior to delivery to a cooking zone. Generally, such machines as have been proposed fail to handle dough of a consistency such as to produce a doughnut of a desired texture, either from a raised dough or self-rising dough. Many of the doughnut making machines proposed require that the dough be of a consistency as to flow readily to the forming device.

An object of the present invention is to provide a dough making machine which employs a positive pressure means for ejecting a quantity of dough through a doughnut shaping aperture, with positive cutoff means preventing the escape of dough from the machine between doughnut making cycles.

Another object of the present invention is to provide a doughnut making machine which is simple in structure, one readily assembled and disassembled for cleaning and sterilizing, one having relatively few parts, and one which is economically feasible.

These and other objects and advantages of the present invention will be fully apparent from the following description when taken in conjunction with the annexed drawings, in which:

Figure 1 is an isometric view of the doughnut making machine according to the present invention, as seen from the front and one side;

Figure 2 is a view similar to Figure 1 with portions of the machine broken away, as seen from the rear and the other side;

Figure 3 is a top plan view of the machine, shown at the start of a cycle;

Figure 4 is a sectional view taken on the line 4—4 of Figure 3, with a central portion of the machine shown broken away;

Figure 5 is a view similar to Figure 3, showing the machine one-quarter way through a cycle of operation;

Figure 6 is a sectional view taken on the line 6—6 of Figure 5, with a central portion of the machine broken away;

Figure 7 is a sectional view on an enlarged scale, taken on the line 7—7 of of Figure 6;

Figure 8 is a sectional view taken on the line 8—8 of Figure 7; and

Figure 9 is a sectional view taken on the line 9—9 of Figure 7.

Referring in greater detail to the drawings in which like numerals indicate like parts throughout the several views, the reference numeral 10 designates a hopper of cylindrical form tapering at the lower end to a discharge end, as indicated at 12 in Figures 1, 4, and 6. A vertical doughnut forming cylinder 14 projects longitudinally from the discharge end 12 of the hopper 10.

A vertically disposed rod member 16 extends axially through the hopper 10 and through the cylinder 14 and has the portion adjacent the lower end thereof below and normally spaced from the lower end of the cylinder 14. The portion of the rod member 16 adjacent the upper end extends exteriorly above the hopper 10 and is fixedly supported from the hopper 10 by means of an inverted L-shaped member 18 (Figures 2 and 4) secured adjacent the free end of its long leg to a semicylindrical band 20 encircling a portion of the hopper 10. The mid-portion of the long leg of the L-shaped member 18 is secured to one end of another semicylindrically shaped band having a horizontally disposed flange extending about the hopper 10 in opposed relation with respect to the band 20, the last-named band and flange being designated by the numerals 22 and 24, respectively.

The upper end of the rod member 16 is provided with a threaded portion threadedly received in the threaded bore provided in the free end portion of the short leg of the L-shaped member 18.

A horizontally disposed disc 26 is fixedly secured to the lower end of the rod member 16. The disc 26 is spaced from the lower end of the cylinder 14 and the space between the periphery of the disc 26 and the lower end of the cylinder 14 forms an annular dough discharge opening, as indicated at 28 in Figure 6.

A tubular element 30 is circumposed about and is slidable upwardly and downwardly on the rod member 16 intermediate the ends of the latter. Inwardly of and below the upper end of the tubular element 30 are a pair of spaced collars 32 and 34.

A flat piston 36 is positioned adjacent the lower end of the tubular element 30 so as to face the discharge end of the hopper 10 and is fixedly secured to the tubular element 30 for movement therewith.

A cutoff sleeve 38 is circumposed about the cylinder 14 with the lower end portion normally bridging the upper part of the annular discharge opening 28. The sleeve 38 is supported on the lower end of a rod 40 which is located exteriorly of the hopper 10. The upper end of the rod 40 is pivotally connected to an actuating member 42 pivotally supported from the hopper 10. The actuating member 42 rocks about a horizontally disposed pin 44 carried in the upper end of a post 46 which is mounted upon the hopper 10. Upon rocking movement of the actuating member 42 the sleeve 38 moves from the normal position (Figure 6) in which a part of the dough discharge opening 28 is bridged by the lower end portion of the sleeve 38 to a position wholly closing the dough discharge opening 28, as shown in Figure 4.

A follower 48, conformably shaped to fit within the hopper 10, is positioned within the hopper 10 and is slidably circumposed about the tubular element 30 and is mounted on the tubular element 30 for upward and downward movement therealong.

Means is provided operatively connecting the follower 48, tubular element 30, and the sleeve 38 together so that downward movement of the follower 48 occurs simultaneously with downward movement of the tubular element 30 followed by movement of the sleeve 38 from the normal position to the position wholly closing the dough discharge opening 28. This means includes a vertically disposed screw 50 having the lower end secured to the follower 48, as shown in Figure 6. A nut 52 is circumposed about a portion of the screw 50 inwardly of the upper end and is in threaded engagement with the screw 50. In Figure 7, the nut 52 is shown bolted to the lower end of a bushing member 54 loosely circumposed about the screw 50. Ratchet means is provided on the flanged lower end portion of the bushing member 54 and comprises ratchet teeth 56 engaged by one or the other of two pawls 58 and 59 rockably mounted about a vertical pin 60 projecting downwardly from one arm 62 of a clamp member 64 which is releasably circumposed about the midpart of the bushing member 54. The two pawls 58 and 59 permit fine adjustment of the dough discharge.

A vertically disposed rigid support 66, fabricated of channel-shaped material, is supported exteriorly of the hopper 10 with its lower end connected to a horizontally disposed strut 68 projecting from the adjacent portion of a band 70 which encircles the lower end portion of the hopper 10. Another strut 72 projects from the band 22 and carries the support 66. A plate 74 projects from the support 66 inwardly of the upper end. To the free end of the plate 74 is bolted one section 76 of a support element 78. The element 78 has a second section 80 hingedly secured to the section 76 for pivotal movement about a vertically disposed pin 82. The portions of the support elements 78 and 80 remote from the pin 82 are provided with complementally arranged notches receiving the nut 52, as shown in Figures 7 and 9. A tie-bolt 84 releasably secures the sections 76 and 80 together.

As shown in Figures 8 and 9, both the nut 52 and bushing member 54 are formed in two halves each, permitting rapid assembly and disassembly for thorough cleaning of the components of the ratchet means.

The post 46 includes on its upper end a pair of upstanding lugs 86 and 88 in which is journaled a rotatable shaft 90 having a crank assembly on one end thereof, as indicated by the numeral 92 in Figures 1, 2, 3, and 5.

A cam mechanism, designated generally by the numeral 94, connects the tubular element 30 and the sleeve 38 to the nut 52 so that rotation of the nut 52 causes simultaneous downward movement of the tubular element 30 with the follower 48 followed by downward movement of the sleeve 38 from the normal position to the position wholly closing the opening 28. This cam mechanism includes the actuating member 42 which is provided with a closed slot 96 in which is rotatable an eccentric 98 mounted upon the shaft 90. The end of the actuating member 42 remote from the slot 96 is bifurcated, as at 100 in Figures 3, 5, and 6, and extends on each side of the portion of the tubular element 30 between the collars 32 and 34.

On the end of the shaft 90 remote from the crank assembly 92 is a crank element 102 connecting one end of a link 104 to the shaft 90. The other end of the link 104 is pivotally connected to the other arm 106 of the clamp member 64 which is bolted to one end of arm 62 and hinged on the other end thereof.

The means connecting the one end of the link 104 to the arm 106 includes a universal joint, 108, and a slider 110 slidably mounted by means of a bolt and nut assembly 112 to the arm 106 for adjustment therealong.

The portion of the bushing member 54 adjacent its upper end is provided on its periphery with a plurality of teeth 114 (Figure 7) which serve as anchoring means for a tool (not shown) for rotating the bushing member 54 sufficiently to disengage the pawls 58 and 59 so that the follower 48 may be removed from the hopper 10 when it is desired to refill the hopper 10 or to clean and sterilize the various components of my machine.

In operation, the hopper 10 may be supported by the lugs 116 which project from the web of the support 66 on any suitable vertical surface. A mass of doughnut dough is placed within the hopper 10 and the follower 48 is positioned on the top of the mass of dough. Upon turning of the crank of the crank assembly 92 in the clockwise direction (Figure 2), the link 104 reciprocates to oscillate the clamp member 64 about the screw 50 with one of the pawls 58 or 59 engaging the teeth 56 on the bushing member 54 and rotating the latter so as to effect the downward movement of the screw 50 and attached follower 48. Upon rotation of the shaft 90, the actuating member 42 completes a cycle of rocking movement about the pin 44 as a horizontal axis. In Figure 3, the crank assembly 92 is in the vertical position prior to beginning of a cycle of operation. In Figure 5, the shaft 90 has been turned a quarter of a turn in the clockwise direction and the actuating member 42 has been raised by the cam or eccentric 98 so as to effect the downward movement of the tubular member 30. This is simultaneously with the movement of the clamp member 64 in the counterclockwise direction of Figure 3 and turning movement of the bushing member 54 by the pawls 58 and 59. Upon completion of one revolution of the shaft 90, the actuating member 42 returns to its initial position shown in Figure 4 and drives the sleeve 38 downwardly over the opening 28 to thereby cut off a mass of dough in ring form discharged through such opening 28, as shown in Figure 4.

It will be seen therefore that the machine of the present invention has positive pressure means embodying the follower 48 for pressing the dough outwardly through the opening 28 with the piston 36 effecting an upward and downward movement to completely fill the cylinder 14 with each stroke of the piston 36. The amount of dough ejected through the opening 28 with each cycle of operation is governed by the position of the slider 110 on the arm 106 of the clamp member 64.

What is claimed is:

1. A doughnut making machine comprising a hopper having a vertical forming cylinder projecting longitudinally from its discharge end, a vertically disposed rod member extending axially through said hopper and cylinder and having its lower end below and spaced from the lower end of said cylinder and having its upper end exteriorly of said hopper and fixedly supported from said hopper, a horizontally disposed disc carried on the lower end of said rod member and spaced from the lower end of said cylinder and forming an annular dough discharge opening, a tubular element circumposed about and slidable upwardly and downwardly on said rod member intermediate the ends thereof, a piston positioned adjacent the lower end of said tubular element so as to face said discharge end of said hopper and secured to said tubular element for movement therewith, a cutoff sleeve circumposed about said cylinder with its lower end portion normally bridging a part of said annular dough discharge opening, means supporting said sleeve from said hopper for movement from the normal position to a position wholly closing said annular discharge opening, a follower conformably shaped to fit within said hopper positioned within said hopper and slidably circumposed about said tubular element and mounted on said tubular element for upward and downward movement therealong, and means operatively connecting said follower, and tubular element and cutoff sleeve together so that downward movement of said follower occurs simultaneously with downward movement of said tubular element followed by movement of said sleeve from the normal position to the position wholly closing said annular dough discharge opening, said connecting means including a vertically disposed screw having the lower end secured to said follower, a nut in threaded engagement with said screw, hand operable means operatively connected to said nut for effecting rotation of said nut and causing downward movement of said follower, and a cam mechanism connected to said tubular element and hand operable means so that rotation of said nut occurs simultaneously with downward movement of said tubular element followed by movement of said sleeve from the normal position to the position wholly closing said annular discharge opening.

2. A doughnut making machine comprising a hopper having a vertical forming cylinder projecting longitudinally from its discharge end, a vertically disposed rod member extending axially through said hopper and cylinder and having its lower end below and spaced from the lower end of said cylinder and having its upper end extending exteriorly of said hopper and fixedly supported from said hopper, a horizontally disposed disc carried on the lower end of said rod member and spaced from the lower end of said cylinder and forming an annular dough discharge opening, a tubular element circumposed about and slidable upwardly and downwardly on said rod member intermediate the ends thereof, a piston positioned adjacent the lower end of said tubular element so as to face said discharge end of said hopper and secured to said tubular element for movement therewith, a cutoff sleeve circumposed about said cylinder with its lower end portion normally bridging a part of said annular dough discharge opening, means supporting said sleeve from said hopper for movement from the normal position to a position wholly closing said annular discharge opening, a follower conformably shaped to fit within said hopper positioned within said hopper and slidably circumposed about said tubular element and mounted on said tubular element for upward and downward movement therealong, and means operatively connecting said follower, and tubular element and cutoff sleeve together so that downward movement of said follower occurs simultaneously with downward movement of said tubular element followed by movement of said sleeve from the normal position to the position wholly closing said annular dough discharge opening, said connecting means including a vertically disposed screw having the lower end secured to said follower, a nut in threaded engagement with said screw, hand operable means including a ratchet mechanism operatively connected to said nut for effecting rotation of said nut and causing downward movement of said follower, and a cam mechanism connected to said tubular element and hand operable means so that rotation of said nut occurs simultaneously with downward movement of said tubular element followed by movement of said sleeve from the normal position to the position wholly closing said annular discharge opening.

3. A doughnut making machine comprising a hopper having a vertical forming cylinder projecting longitudinally from its discharge end, a vertically disposed rod member extending axially through said hopper and cylinder and having its lower end below and spaced from the lower end of said cylinder and having its upper end extending exteriorly of said hopper and fixedly supported from said hopper, a horizontally disposed disc carried on the lower end of said rod member and spaced from the lower end of said cylinder forming an annular dough discharge opening, a tubular element circumposed about and slidable upwardly and downwardly on said rod member intermediate the ends thereof, a piston positioned adjacent the lower end of said tubular element so as to face said discharge end of said hopper and secured to said tubular element for movement therewith, a cutoff sleeve circumposed about said cylinder with its lower end portion normally bridging a part of said annular dough discharge opening, means supporting said sleeve from said hopper for movement from the normal position to a position wholly closing said annular discharge opening, a follower conformably shaped to fit within said hopper positioned within said hopper and slidably circumposed about said tubular element and mounted on said tubular element for upward and downward movement therealong, and means operatively connecting said follower, and tubular element and cutoff sleeve together so that downward movement of said follower occurs simultaneously with downward movement of said tubular element followed by movement of said sleeve from the normal position to the position wholly closing said annular dough discharge opening, said connecting means including a vertically disposed screw having the lower end secured to said follower, a nut in threaded engagement with said screw, hand operable means including a ratchet mechanism operatively connected to said nut for effecting rotation of said nut and causing downward movement of said follower, and a cam mechanism including an actuating member pivotally supported from said hopper with a portion in engagement with said tubular element and a cam carried by said hand actuable means riding in a closed slot formed in said actuating member connected to said tubular element and hand operable means so that rotation of said nut occurs simultaneously with downward movement of said tubular element followed by movement of said sleeve from the normal position to the position wholly closing said annular discharge opening.

References Cited in the file of this patent

UNITED STATES PATENTS

| | | |
|---|---|---|
| 1,776,780 | Carpenter | Sept. 30, 1930 |
| 2,536,649 | Lindsey | Jan. 2, 1951 |
| 2,840,012 | Giles | June 24, 1958 |